United States Patent Office 2,698,221

Patented Dec. 28, 1954

2,698,221

PREPARING TITANIUM COMPOUNDS

Eugene Wainer, Cleveland Heights, Morris A. Steinberg, Lakewood, and Merle E. Sibert, Garfield Heights, Ohio, assignors, by mesne assignments, to Horizons Titanium Corporation, Princeton, N. J., a corporation of New Jersey No Drawing. Application August 25, 1951, Serial No. 243,765

3 Claims. (Cl. 23—202)

Thermal production of titanium monoxide from titanium carbide involves a reaction which is susceptible to failure from the disturbance of other substances. Heretofore it has been considered that only highly purified TiC can be applied. As the first step in the process thus, on TiC in the crude state in which it is primarily available, extensive purification has been required. To get rid of contaminating free carbon, the especially important impurity, has necessitated careful and tedious procedure, and this has correspondingly slowed the TiO process, and also added a factor to the cost. We have now found however, that the problem can be approached in another way, and it becomes possible to use crude TiC as it is. An advantage of simplified operation and enhanced throughput correspondingly becomes possible. Other objects and advantages will appear from the following description.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

In the patent applications of Eugene Wainer et al., Ser. No. 206,712, filed January 18, 1951 and Ser. No. 236,476, filed July 12, 1951, there are set forth processes of making titanium monoxide from purified titanium carbide. Primarily carbide of titanium is impure. Crude titanium carbide as available, quite consistently carries a content of carbon, which may be more or less graphitized. This raw material is, in accordance with the present process, mixed with one or more oxides of the general formula $MO_n$ in which $MO_n$ is $TiO_2$ and M otherwise is a metal of group II of the periodic table with atomic number in the range 12–56 inclusive and $O_n$ therewith is an atom of oxygen. Thus, the oxide reactant is the higher oxide of titanium itself or a monoxide of a periodic second group metal with atomic number in the range 12–56 inclusive, and of these latter oxides, zinc, magnesium and calcium are particularly desirable commercially. The oxide is mixed with the titanium carbide in proportion stoichiometrically calculated to give with the TiC a product of TiO. Also, there is added an amount of oxide stoichiometrically proportioned to the contaminating carbon which analysis shows to be present in the particular material being operated upon. Experience shows that the amount of contaminating carbon found in commercially produced titanium carbide generally runs in the neighborhood of one to two per cent. The reaction material thus comprises a stoichiometric amount of oxide for the TiC, plus a stoichiometric amount of oxide for the carbon contaminant.

The reaction material should be finely divided. The finer the state of division, the more rapid and complete is the reaction. A particle size of fifty microns or less is advisable. This can be readily attained by known comminution practices.

If a crude TiC contains iron, this can be initially removed by a hydrochloric acid leach; for instance by boiling the crude titanium carbide in a 50 per cent water, 50 per cent HCl acid until the iron has been leached out. A final washing in water removes the last trace of chloride.

For convenient furnacing it is desirable to form the mixed powder material into shapes or pellets. These may conveniently be cylindrical and of a size for instance about ½ x ½ in. A high pressure press is suitable for this, and a forming pressure of at least ten tons per sq. in. is desirable. By the preliminary inclusion of five to ten per cent of moistening liquid such as xylene, alcohol, or water for instance as a temporary binder, the molding proceeds satisfactorily to dense shapes which withstand handling. The pressed pellets are then thoroughly dried.

The pellets are subjected for reaction to a temperature in the range of 1100–1750° C., most usually around 1500° C., and at such temperature the reaction is completed in one or two hours. At higher temperature, the reaction proceeds much more rapidly, and in general the higher the temperature, the more rapid the reaction rate.

Reaction is to be carried out in absence of oxidizing atmosphere. Desirably, an actively pumping vacuum system is employed with the reaction zone. Where desired however, reaction may be carried out under an inert gas, for instance purified argon. From a commercial point of view, a vacuum is cheaper.

Operating under vacuum, for instance on the order of one to ten mm. of mercury, a rapid change in pressure is noted above 1100° C., indicating that reaction is proceeding and gases are being given off. By maintaining the temperature then in the range for instance of 1450 to 1550° C. until full vacuum conditions are again regained, this shows that reaction is complete.

During reaction the by-products are gasiform. There is carbon monoxide, and such metals as zinc, magnesium and calcium formed as a result of reaction, sublime as vapor. These sublimed metals are condensed in a cold trap and are generally present in an extremely finely divided state. After the reaction mass cools down, the equipment is flushed out with an inert gas or hydrogen, as a precaution to avoid spontaneous ignition of finely powdered metal in the presence of air. If desired, the zinc, calcium or other metal which is given off can be collected in a fused state, being melted down in the presence of argon from the cold trap at temperatures slightly above melting point. Where mixtures of oxides are employed, as for instance titanium dioxide plus smaller amounts of magnesia or lime, there is the advantage of complete reduction of the carbide of titanium to monoxide with a certain degree of stability. Such a mixture can be used when the reaction mixtures are very massive. The primary effect seems to be the prevention of reversal of reaction if the carbon monoxide is not eliminated from the reaction zone rapidly enough. In all cases, the carbon contaminant undergoes a change to carbon monoxide in reaction, such CO going off with that formed from the titanium carbide, and in all cases, the residue left is TiO. As the components of the reaction mixture are on a calculated stoichiometric basis, everything other than the TiO product has been eliminated in gasiform condition; as where titanium dioxide is the reactant with the carbide of titanium, titanium monoxide and carbon monoxide are formed, and likewise, where oxides of zinc, magnesium or other second group metal are used, similarly titanium monoxide is formed, and carbon monoxide, and there is the sublimation of the metallic zinc, magnesium or calcium.

Illustrative of the process are the following examples:

*Example 1.*—74.9 g. of titanium carbide containing 0.6 g. of free carbon or graphite (0.8%) was reacted with 203.4 g. of zinc oxide, plus an additional 4.1 g. the amount calculated as the stoichiometric requirement to react with the 0.6 g. of free carbon. This mixture was heated in vacuo for 75 minutes at 1350° C. yielding 80 g. of pure titanium monoxide.

*Example 2.*—1.890 g. of titanium carbide containing excess carbon in the amount of 0.02 g. (2.2%) was mixed with 5.243 g. of zinc oxide. This 5.243 g. of zinc oxide included 0.136 g. of excess ZnO calculated to react with the free carbon. Two grams of pure titanium monoxide without free carbon or excess zinc oxide was obtained after heating in vacuo for 60 minutes at 1450° C.

*Example 3.*—37.4 g. of titanium carbide containing 0.4 g. free carbon (1.06%) was mixed with 101.8 g. zinc oxide as stoichiometrically required. In addition, 6.8 g. free carbon (giving 19 weight percent total free C in TiC) and 46.2 g. zinc oxide to compensate for this carbon was added to fully demonstrate the use of impure titanium carbide in this process. The total mixture of 37.0 g. TiC (19.3%), 7.2 g. C (3.7%) and 148.2 g. ZnO (77%) was then heated in vacuo for 75 minutes at 1400° C. This yielded 40.0 g. pure titanium monoxide, showing that a known excess of carbon in the starting carbide can be compensated by adding excess zinc oxide according to the stoichiometric ratio.

*Example 4.*—47.3 g. of raw titanium carbide containing 0.4 g. of free carbon (0.8%) was added to 63.1 g. raw MgO. In addition 4.3 g. of carbon black was added to the mix giving a total of 4.7 g. as 10% free carbon in the carbide. This necessitated 15.8 g. additional MgO to react with this carbon. Then a further MgO addition of 8.0 g. was required since the MgO has an ignition loss of 9.2%. This was then a total of 47.3 g. raw TiC, 86.9 g. MgO, and 4.3 g. C. This mixture was heated in vacuo for 90 minutes at 1500° C. giving 49.5 g. of pure TiO (theory 50.0 g.) with no evidence of MgO, TiC, or free C.

In all of the examples, the yield of titanium monoxide was a porous golden brown regulus, which on X-ray examination indicated that this material is substantially pure titanium monoxide.

Other oxide as stated, is also used similarly instead of zinc and magnesium oxides to yield the same results.

Other modes of applying the principle of the invention may be employed, change being made as regards the details described, provided the features stated in any of the following claims or the equivalent of such be employed.

We therefore particularly point out and distinctly claim as our invention:

1. The method of producing titanium monoxide from titanium carbide containing free carbon as an impurity which comprises forming an intimate mixture of said titanium carbide and a molar amount of a metal oxide of the group consisting of zinc oxide, calcium oxide and magnesium oxide substantially equal to (*a*) twice the molar amount of the titanium carbide plus (*b*) the molar amount of said free carbon, heating the mixture to a temperature of about 1350° to 1750° C. in an inert atmosphere, removing the resulting evolved carbon monoxide and vapor of the metal constituent of said metal oxide, and recovering the resulting residual titanium monoxide.

2. The method of producing titanium monoxide from titanium carbide containing free carbon as an impurity which comprises forming an intimate mixture of said titanium carbide and a molar amount of a metal oxide of the group consisting of zinc oxide, calcium oxide and magnesium oxide substantially equal to (*a*) twice the molar amount of the titanium carbide plus (*b*) the molar amount of said free carbon, heating the mixture to a temperature of about 1450° to 1550° C. in an inert atmosphere, removing the resulting evolved carbon monoxide and vapor of the metal constituent of said metal oxide, and recovering the resulting residual titanium monoxide.

3. The method of producing titanium monoxide from titanium carbide containing free carbon as an impurity which comprises pelleting an intimate mixture of said titanium carbide and a molar amount of a metal oxide of the group consisting of zinc oxide, calcium oxide and magnesium oxide substantially equal to (*a*) twice the molar amount of the titanium carbide plus (*b*) the molar amount of said free carbon, heating the pelleted mixture to a temperature of about 1450° to 1550° C. in an inert atmosphere, removing the resulting evolved carbon monoxide and vapor of the metal constituent of said metal oxide, and recovering the resulting residual titanium monoxide.

References Cited in the file of this patent

UNITED STATES PATENTS

| Number | Name | Date |
|---|---|---|
| 2,149,939 | Kinzie et al. | Mar. 7, 1939 |
| 2,158,520 | Meyer | May 16, 1939 |
| 2,515,463 | McKenna | July 18, 1950 |